US012653096B2

(12) United States Patent
Guo et al.

(10) Patent No.: US 12,653,096 B2
(45) Date of Patent: Jun. 16, 2026

(54) CUTTING TOOL AND CONTROL METHOD

(71) Applicant: Nanjing Chervon Industry Co., Ltd.,
Nanjing (CN)

(72) Inventors: Zengbing Guo, Nanjing (CN); Haiyan Li, Nanjing (CN)

(73) Assignee: Nanjing Chervon Industry Co., Ltd.,
Nanjing (CN)

( * ) Notice: Subject to any disclaimer, the term of this patent is extended or adjusted under 35 U.S.C. 154(b) by 442 days.

(21) Appl. No.: 18/335,238

(22) Filed: Jun. 15, 2023

(65) Prior Publication Data

US 2024/0032466 A1      Feb. 1, 2024

(30) Foreign Application Priority Data

Jul. 27, 2022    (CN) .......................... 202210889547.6

(51) Int. Cl.
H02P 6/20          (2016.01)
A01D 34/68        (2006.01)
(Continued)

(52) U.S. Cl.
CPC ....... A01D 34/6818 (2013.01); A01G 3/0475 (2013.01); A01G 3/086 (2013.01);
(Continued)

(58) Field of Classification Search
CPC .. A01D 34/6818; A01G 3/0475; A01G 3/086; A01G 3/088; A01G 23/095; H02K 7/145; H02P 6/20
See application file for complete search history.

(56) References Cited

U.S. PATENT DOCUMENTS 9,325,263 B1 * 4/2016 Costanzo ................ H02P 21/18
2004/0257028 A1 * 12/2004 Schulz .................... H02P 21/28
318/268

(Continued)

FOREIGN PATENT DOCUMENTS

CN          107222137 B      11/2019
JP          2022084449 A  *   6/2022
(Continued)

OTHER PUBLICATIONS

English Translation of WO-2020001904-A1 (Year: 2020).*

(Continued)

*Primary Examiner* — Claude J Brown
(74) *Attorney, Agent, or Firm* — Greenberg Traurig, LLP

(57)          ABSTRACT

A cutting tool includes: an electric motor with a stator having multiple windings and a rotor; a driver circuit electrically connected to the electric motor to drive the electric motor to run; and a controller configured to estimate the angular position of the rotor based on a working parameter of the electric motor and output a drive signal to the driver circuit based on the angular position of the rotor to control the rotation of the electric motor. At a start stage, the controller is configured to: when an abnormal start of the electric motor is detected, output a first control instruction to control the electric motor to restart, where the first control instruction includes at least the instruction to input a high-frequency signal into the driver circuit so as to acquire the angular position of the rotor.

14 Claims, 5 Drawing Sheets

(51) Int. Cl.
    *A01G 3/047*        (2006.01)
    *A01G 3/08*         (2006.01)
    *A01G 23/095*      (2006.01)
    *H02K 7/14*         (2006.01)

(52) U.S. Cl.
    CPC ........... *A01G 3/088* (2013.01); *A01G 23/095*
         (2013.01); *H02K 7/145* (2013.01); *H02P 6/20*
                             (2013.01)

(56)             References Cited

U.S. PATENT DOCUMENTS

| | | | |
|---|---|---|---|
| 2016/0318171 A1 * | 11/2016 | Gonzales | A01G 3/085 |
| 2016/0351039 A1 * | 12/2016 | Nishikawa | G08B 21/18 |
| 2021/0101303 A1 * | 4/2021 | Hess | B27B 17/08 |
| 2022/0174879 A1 * | 6/2022 | Suzuki | A01G 3/053 |
| 2022/0176476 A1 * | 6/2022 | Suzuki | B23D 45/048 |

FOREIGN PATENT DOCUMENTS

| | | | | |
|---|---|---|---|---|
| WO | WO-2020001904 A1 * | 1/2020 | | H02P 6/20 |
| WO | 2021031138 A1 | 2/2021 | | |

OTHER PUBLICATIONS

English Translation of JP-2022084449-A (Year: 2022).*
Extended European Search Report from European application No.
23179647.5, dated Dec. 18, 2023, 8 pp.

* cited by examiner

100

101

102

11

20

10

Rotor

Electric motor

Driver
circuit

Controller

30

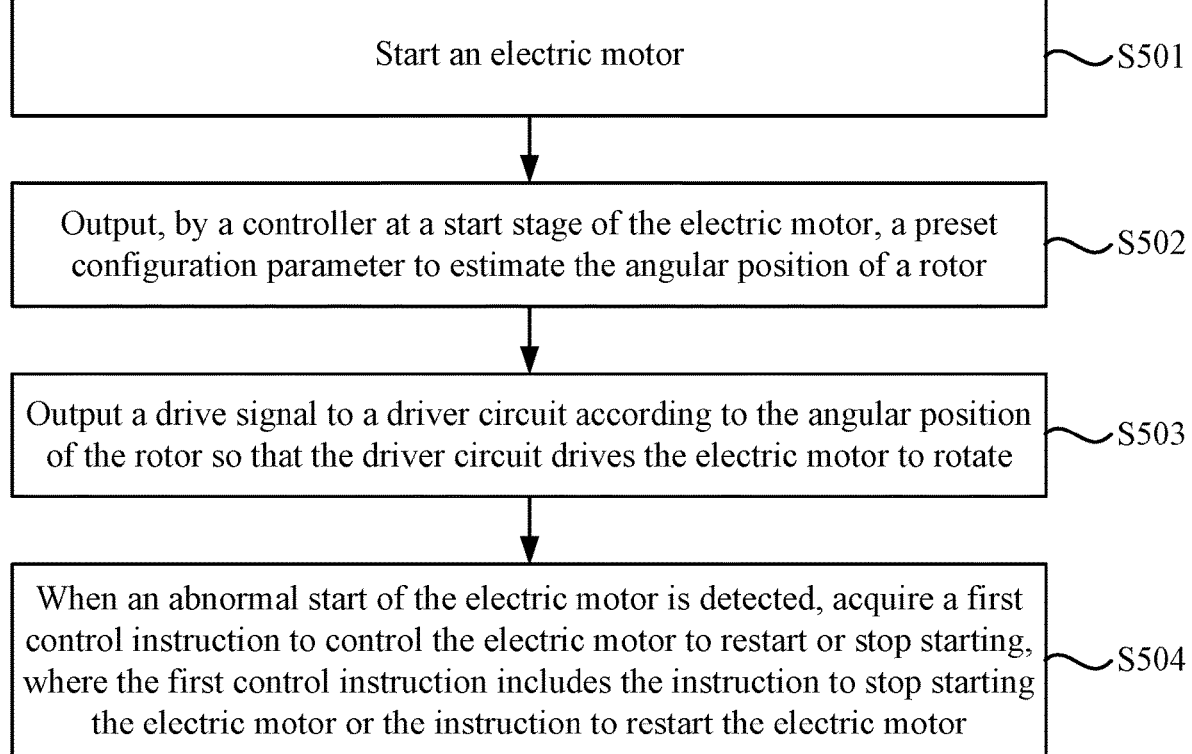

Start an electric motor    ∽S501

Output, by a controller at a start stage of the electric motor, a preset configuration parameter to estimate the angular position of a rotor    ∽S502

Output a drive signal to a driver circuit according to the angular position of the rotor so that the driver circuit drives the electric motor to rotate    ∽S503

When an abnormal start of the electric motor is detected, acquire a first control instruction to control the electric motor to restart or stop starting, where the first control instruction includes the instruction to stop starting the electric motor or the instruction to restart the electric motor    ∽S504

FIG. 6

CUTTING TOOL AND CONTROL METHOD

RELATED APPLICATION INFORMATION

This application claims the benefit under 35 U.S.C. § 119(a) of Chinese Patent Application No. 202210889547.6, filed on Jul. 27, 2022, which application is incorporated herein by reference in its entirety.

BACKGROUND

Cutting tools such as pole saws or hedge trimmers have been widely used in people's daily lives. Typically, an electric motor is disposed in a cutting tool and provides a driving force for the tool to ensure the normal working of the tool. However, in the process where a power tool starts, especially, in the process where the power tool starts with load, the efficiency with which the power tool starts is relatively low, which affects the user experience of the tool.

SUMMARY

In some examples, a cutting tool includes: a cutting element; an electric motor configured to drive the cutting element to perform a cutting function and including a stator having multiple windings and a rotor; a driver circuit electrically connected to the electric motor to drive the electric motor to run; and a controller configured to estimate the angular position of the rotor based on a working parameter of the electric motor and output a drive signal to the driver circuit based on the angular position of the rotor to control the rotation of the electric motor. At a start stage, the controller is configured to: when an abnormal start of the electric motor is detected, input a first control instruction to control the electric motor to restart, where the first control instruction is the instruction to acquire the angular position of the rotor with a high-frequency signal injection method.

In some examples, the present application provides a power tool. The power tool includes: a housing; an electric motor disposed in the housing and including a stator having multiple windings and a rotor; a driver circuit electrically connected to the electric motor to drive the electric motor to run; and a controller configured to estimate the angular position of the rotor based on a working parameter of the electric motor and output a drive signal to the driver circuit based on the angular position of the rotor to control the rotation of the electric motor. At a start stage, the controller is configured to: when an abnormal start of the electric motor is detected, input a first control instruction to control the electric motor to restart, where the first control instruction includes the instruction to acquire the angular position of the rotor with a high-frequency signal injection method.

In some examples, a method for controlling the start of a cutting tool is provided, where the power tool includes an electric motor, a driver circuit electrically connected to the electric motor, and a controller electrically connected to the electric motor and the driver circuit separately, and the electric motor includes a rotor. The control method includes: acquiring a working parameter of the electric motor; estimating the angular position of the rotor according to the working parameter of the electric motor at a start stage of the electric motor; outputting a drive signal to the driver circuit according to the angular position of the rotor so that the driver circuit drives the electric motor to rotate; and when an abnormal start of the electric motor is detected, acquiring a first control instruction to control the electric motor to restart or stop starting, where the first control instruction includes the instruction to stop starting the electric motor or the instruction to restart the electric motor.

It is to be understood that the content described in this part is neither intended to identify key or important features of examples of the present application nor intended to limit the scope of the present application. Other features of the present application are apparent from the description provided hereinafter.

BRIEF DESCRIPTION OF THE DRAWINGS

FIG. 6 is a flowchart of a method for controlling the start of a power tool according to an example of the present application.

DETAILED DESCRIPTION

To make solved technical problems, adopted technical solutions, and achieved technical effects of the present application more apparent, technical solutions in examples of the present application are further described in detail below in conjunction with drawings. The described examples are merely part, not all, of the examples of the present application. Based on the examples in the present application, all other examples obtained by those skilled in the art without creative work are within the scope of the present application.

In the description of the present application, the terms "joined", "connected", and "fixed" are to be understood in a broad sense unless otherwise expressly specified and limited. For example, the term "connected" may refer to "fixedly connected", "detachably connected", or integrated, may refer to "mechanically connected" or "electrically connected", or may refer to "connected directly", "connected indirectly through an intermediary", "connected inside two elements", or "interaction relations between two elements". For those of ordinary skill in the art, specific meanings of the preceding terms in the present application may be understood based on specific situations.

In the present application, unless otherwise expressly specified and limited, when a first feature is described as "on" or "below" a second feature, the first feature and the second feature may be in direct contact or be in contact via another feature between the two features instead of being in direct contact. Moreover, when the first feature is described as "on", "above", or "over" the second feature, the first feature is right on, above, or over the second feature or the first feature is obliquely on, above, or over the second feature, or the first feature is simply at a higher level than the second feature. When the first feature is described as "under", "below", or "underneath" the second feature, the first feature is right under, below, or underneath the second feature or the first feature is obliquely under, below, or underneath the second feature, or the first feature is simply at a lower level than the second feature.

It is to be understood by those of ordinary skill in the art that a relative term (such as "about", "approximately", and "substantially") used in conjunction with a quantity or a condition includes a stated value and has a meaning dictated by the context (for example, the term includes at least a degree of error associated with the measurement of a particular value, a tolerance (such as manufacturing, assembly, and use) associated with the particular value, and the like.). Such term should also be considered as disclosing the range defined by the absolute values of the two endpoints. The relative term may refer to plus or minus a certain percentage (such as 1%, 5%, 10%, or more) of an indicated value. Of course, a value not modified by the relative term should also be disclosed as a particular value with a tolerance.

Figure 1:
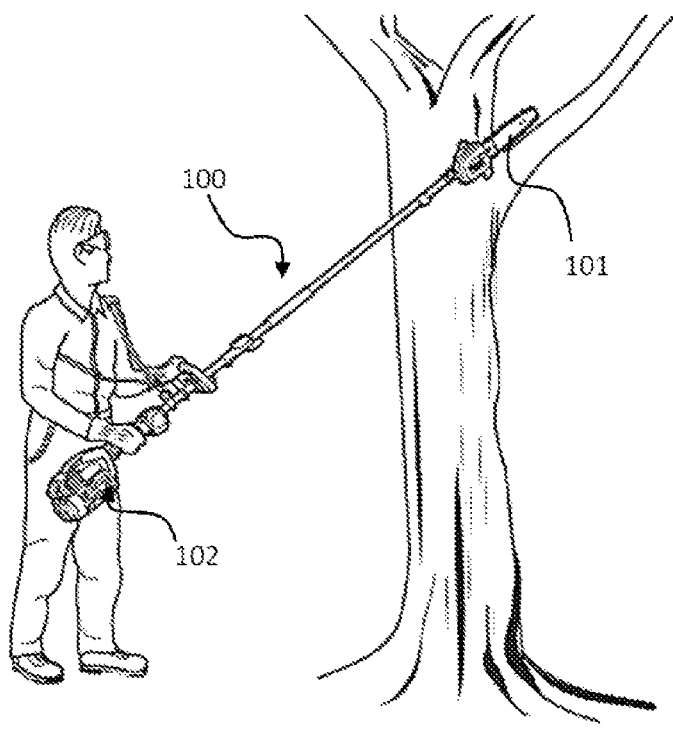
FIG. 1 is a view of a use scenario of a power tool as an example of the present application.

FIG. 1 shows a use scenario of a power tool 100 as an example of the present application. The power tool 100 is a cutting tool, specifically, a pole saw. It is to be noted that the power tool 100 includes, but is not limited to, a power tool 100 for cutting such as the pole saw, a chain saw, a hedge trimmer, a circular saw, and a mower. The pole saw has a cutting element 101 for performing a cutting function of the pole saw. There are two application scenarios when a user cuts wood by operating the pole saw. One of the two application scenarios is that when the user cuts the wood by operating the pole saw, an electric motor is typically started first, after the electric motor is normally started, the saw chain of the pole saw is driven by the electric motor to rotate normally, and then the user approaches to the wood to cut it. In this operation manner, cutting accuracy is low and a cutting position cannot be accurately positioned. The other one of the two application scenarios is that if the pole saw is aligned to the position of the wood to be cut and then the electric motor is started to perform a cutting operation, the cutting accuracy may be improved, but other problems may be caused. For example, when the surface of the wood is relatively rough, the saw chain is easily stuck to the wood, which causes a certain difficulty in starting the electric motor. In addition, in this case, a working parameter of the electric motor, such as a rotational speed or a current, may be abnormal, which causes the electric motor to fail to start. As a result, the efficiency with which the electric motor starts is reduced.

Figure 2:
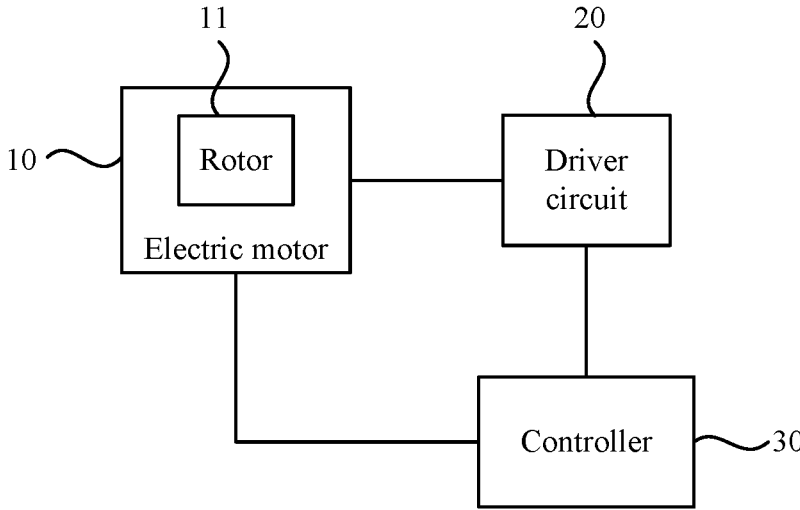
FIG. 2 is a schematic diagram of the electrical control of a power tool according to an example of the present application.

FIG. 2 is a schematic diagram of the electrical control of a power tool 100 as an example of the present application. The power tool 100 includes an electric motor 10, a driver circuit 20 electrically connected to the electric motor 10, a controller 30 at least electrically connected to the driver circuit 20, and a power supply device 102. The power supply device 102 is at least configured to supply electrical energy to the electric motor 10. Specifically, the power supply 102 device includes at least one battery pack. The electric motor 10 includes a rotor 11. The controller 30 is configured to acquire a working parameter of the electric motor 10. At a start stage of the electric motor 10, the controller 30 outputs a preset configuration parameter and acquires the working parameter of the electric motor to estimate the angular position of the rotor 11 and outputs a drive signal to the driver circuit 20 according to the angular position of the rotor 11 to drive the electric motor 10 to rotate. The controller 30 is further configured to detect, at the start stage of the electric motor 10, whether an abnormal start of the electric motor 10 exists. The controller 30 is further configured to output a first control instruction to control the electric motor 10 to restart or stop starting when the abnormal start of the electric motor 10 is detected, where the first control instruction includes the instruction to acquire the angular position of the rotor with a high-frequency signal injection method. The angular position of the rotor is obtained by using the high-frequency signal injection method, which means that a constant high-frequency signal is injected into the motor, and then the angular position of the rotor is obtained, wherein the constant high-frequency signal has corresponding preset configuration parameter.

In some examples, the driver circuit 20 configured to drive the electric motor 10 to work may be a driver circuit including a power switch transistor. Of course, the driver circuit may have different specific circuit structures according to different types of the electric motor 10. For example, when the electric motor 10 is a three-phase brushless direct current motor, a three-phase inverter circuit may be used as the driver circuit 20 to drive the working of the electric motor 10. According to different actual design requirements, the specific circuit structure of the driver circuit is not limited in the present application.

Specifically, at the start stage of the electric motor, the angular position of the rotor is acquired with the high-frequency signal injection method. Specifically, the controller 30 outputs high-frequency signals to the driver circuit 20 to estimate the angular position of the rotor 11. Further, according to the angular position of the rotor 11 and a control algorithm of the electric motor, the controller 30 drives the electric motor 10 to begin a start. In some examples, the high-frequency signals refer to frequencies higher than a nominal switching frequency of the driver circuit 20. In some examples, the nominal switching frequency of the driver circuit 20 is between about 8 kHz and 20 kHz. In addition, during the start of the electric motor 10, the controller 30 acquires the working parameter of the electric motor 10 in real time to determine whether the electric motor 10 starts abnormally. If the electric motor 10 starts abnormally, the controller 30 outputs the corresponding first control instruction, such as the instruction to stop starting the electric motor or the instruction to restart the electric motor, so as to control the electric motor 10 to stop starting or restart. In this manner, the controller 30 controls, according to the instruction to restart the electric motor, the electric motor 10 to restart so that the efficiency with which the power tool 100 starts can be greatly improved and the power tool 100 is prevented from directly reaching a protection level to automatically shut down because of the abnormal start of the electric motor. After the controller 30 controls, according to the instruction to stop starting the electric motor, the electric motor 10 to stop starting, the user may check a working condition of the power tool 100 in time, perform correction, and then control the start and running of the power tool 100 again. The efficiency with which the power tool 100 starts is also improved. In this manner, it is ensured that the product has relatively high reliability, thereby improving user experience and product competitiveness.

It is to be noted that during the start of the electric motor 10, the controller 30 may determine, by acquiring the working parameter of the electric motor 10, whether the electric motor 10 starts abnormally. The working parameter of the electric motor includes, but is not limited to, at least one of a current value, a back electromotive force, a flux linkage, and the rotational speed, which is not specifically limited in the examples of the present application. For the method with which the controller 30 acquires the angular position of the rotor at the start stage, those skilled in the art may use a related algorithm, which is not limited in the present application.

In some examples, at the start stage of the electric motor, the controller outputs a signal with the preset configuration parameter to the electric motor and acquires the working parameter of the electric motor to estimate the angular position of the rotor and outputs the drive signal to the driver circuit according to the angular position of the rotor to drive the electric motor to rotate. In addition, when an abnormal start of the electric motor is detected, the electric motor is controlled through the acquired first control instruction to restart or stop starting. The first control instruction includes the instruction to stop starting the electric motor or the instruction to restart the electric motor so that the efficiency with which the power tool 100 starts can be greatly improved, thereby improving the user experience and the product competitiveness. In some examples, the preset configuration parameter includes a constant high-frequency signal.

Specifically, the constant high-frequency signal may be a high-frequency pulse signal having constant amplitude or may be a high-frequency alternating current signal having a sinusoidal variation and fixed amplitude. The specific form of the constant high-frequency signal may vary according to a specific control algorithm. In addition, the constant high-frequency signal may be a single signal or a group of constant high-frequency signals constituted by multiple signals, which is not specifically limited in the examples of the present application.

Figure 3:
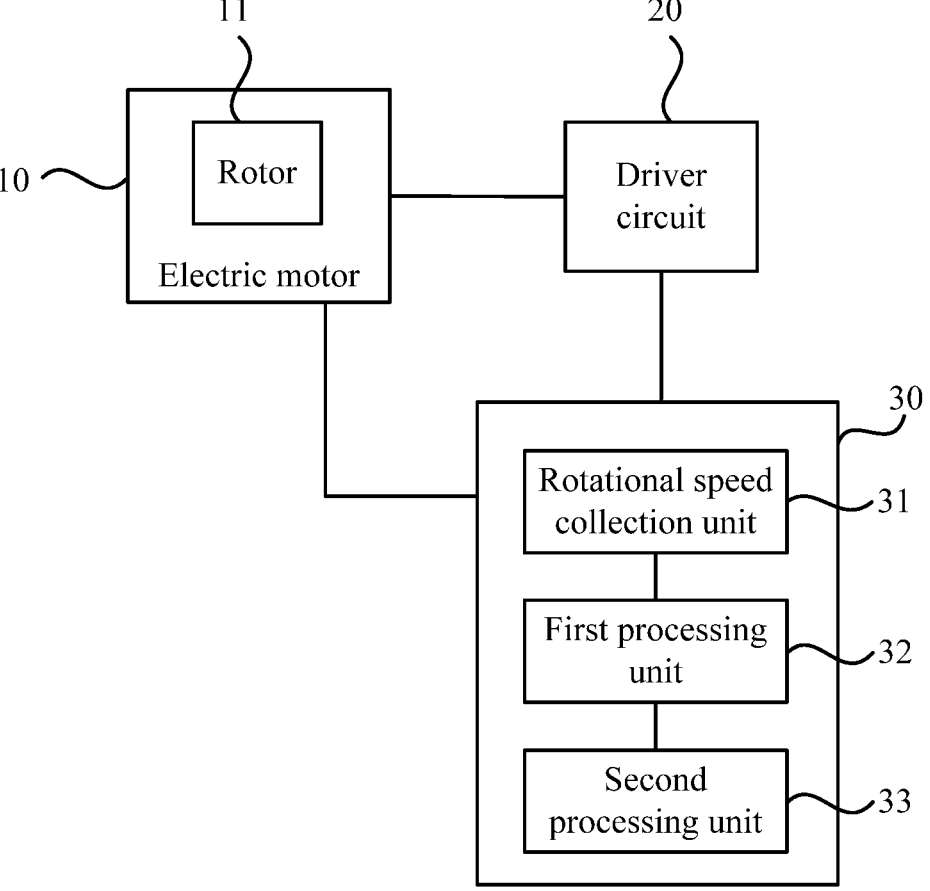
FIG. 3 is a schematic diagram of the electrical control of another power tool according to an example of the present application.

FIG. 3 is a schematic diagram of the electrical control of a power tool 100 as another example in the present application. As shown in FIG. 3, the controller 30 includes a rotational speed collection unit 31 and a first processing unit 32 which are electrically connected to each other. The rotational speed collection unit 31 is configured to acquire an initial rotational speed value of the electric motor 10 at the start stage. When the detected initial rotational speed value is greater than a first preset threshold, the first processing unit 32 is configured to control the electric motor 10 to continue starting, which may be understood as the case where the electric motor enters a regulating session of the start stage with the initial rotational speed value. Alternatively, when the initial rotational speed value is less than or equal to the first preset threshold, the preset configuration parameter is outputted so that the electric motor 10 is restarted.

After the electric motor 10 is started, the rotational speed of the electric motor 10 rapidly increases to a relatively large rotational speed value such as 2000 r/min. It is to be understood that when the electric motor starts without load, the rotational speed of the electric motor after the electric motor enters the start stage rapidly increases to the relatively large rotational speed value. That is, the first preset threshold in the present application may be set to a relatively low rotational speed threshold so that it is accurately determined whether the electric motor 10 starts normally. For example, the first preset threshold is 100 r/min. Of course, the first preset threshold should be set according to an actual situation, which is not specifically limited in the present application.

Specifically, the rotational speed collection unit 31 acquires the initial rotational speed value of the electric motor 10 at the start stage of the electric motor 10 and sends the initial rotational speed value to the first processing unit 32 so that the first processing unit 32 compares the acquired initial rotational speed value with the first preset threshold. If the initial rotational speed value is greater than the first preset threshold, it indicates that the start of the electric motor 10 is normal. Then, the electric motor 10 is controlled to work with the initial rotational speed value to complete a start process. If the initial rotational speed value is less than or equal to the first preset threshold, it indicates that a current rotational speed of the electric motor is relatively low and the start is abnormal. The preset configuration parameter may be outputted and the position of the rotor 11 in the electric motor 10 may be readjusted so that the electric motor 10 is restarted, thereby improving the efficiency with which the power tool 100 starts.

It is to be noted that the rotational speed collection unit 31 includes, but is not limited to, a speed sensor. In some examples, the rotational speed may be calculated through the acquisition of the back electromotive force of the electric motor, which is not limited in the examples of the present application. In addition, a sampling period of the rotational speed collection unit 31 may be selectively set according to actual working conditions, for example, 50 ns, that is, the rotational speed collection unit 31 acquires the initial rotational speed value of the electric motor 10 once every 50 ns.

In some examples, with continued reference to FIG. 3, the working parameter of the electric motor 10 after the electric motor 10 restarts includes at least a rotational speed value and the current value. The controller 30 further includes a second processing unit 33 sequentially connected to the first processing unit 32. The second processing unit 33 is configured to cause the electric motor 10 to enter a normal speed regulating stage after the electric motor 10 restarts and when it is detected that the rotational speed value of the electric motor 10 is greater than or equal to a second preset threshold and the current value of the electric motor 10 is less than or equal to a preset current threshold. Otherwise, the rotational speed collection unit 31 is caused to acquire the initial rotational speed value.

The second preset threshold may be any set rotational speed value and is not specifically limited in the examples of the present application. In addition, the preset current threshold may be any set current value, is also not specifically limited in the examples of the present application, and may be selectively set according to the actual working conditions.

Specifically, after the first processing unit 32 in the controller 30 controls the electric motor 10 to restart, the second processing unit 33 reacquires a rotational speed value and a current value after the electric motor 10 restarts and compares them with the corresponding preset thresholds. If the rotational speed value of the electric motor 10 is greater than or equal to the second preset threshold and the current value of the electric motor 10 is less than or equal to the preset current threshold, it indicates that the start of the electric motor has been completed at this time and there is no abnormality in the start process. Then, the electric motor 10 is controlled to enter the normal speed regulating stage, that is, the power tool 100 may work normally. If the rotational speed value of the electric motor 10 is less than the second preset threshold or the current value of the electric motor 10 is greater than the preset current threshold, it indicates that the electric motor 10 starts abnormally. Then, it is necessary to control the electric motor 10 to restart. In this case, the controller 30 controls, according to the acquired instruction to restart the electric motor, the electric motor 10 to restart so that the rotational speed collection unit 31 continues acquiring the initial rotational speed value.

Notably, before the restart, the electric motor 10 in the power tool 100 requires the controller 30 to acquire the instruction to restart the electric motor so that the rotational speed collection unit 31 can continue acquiring the initial rotational speed value. Thus, damage to the power tool 100 caused by frequent restart operations is avoided.

Figure 4:
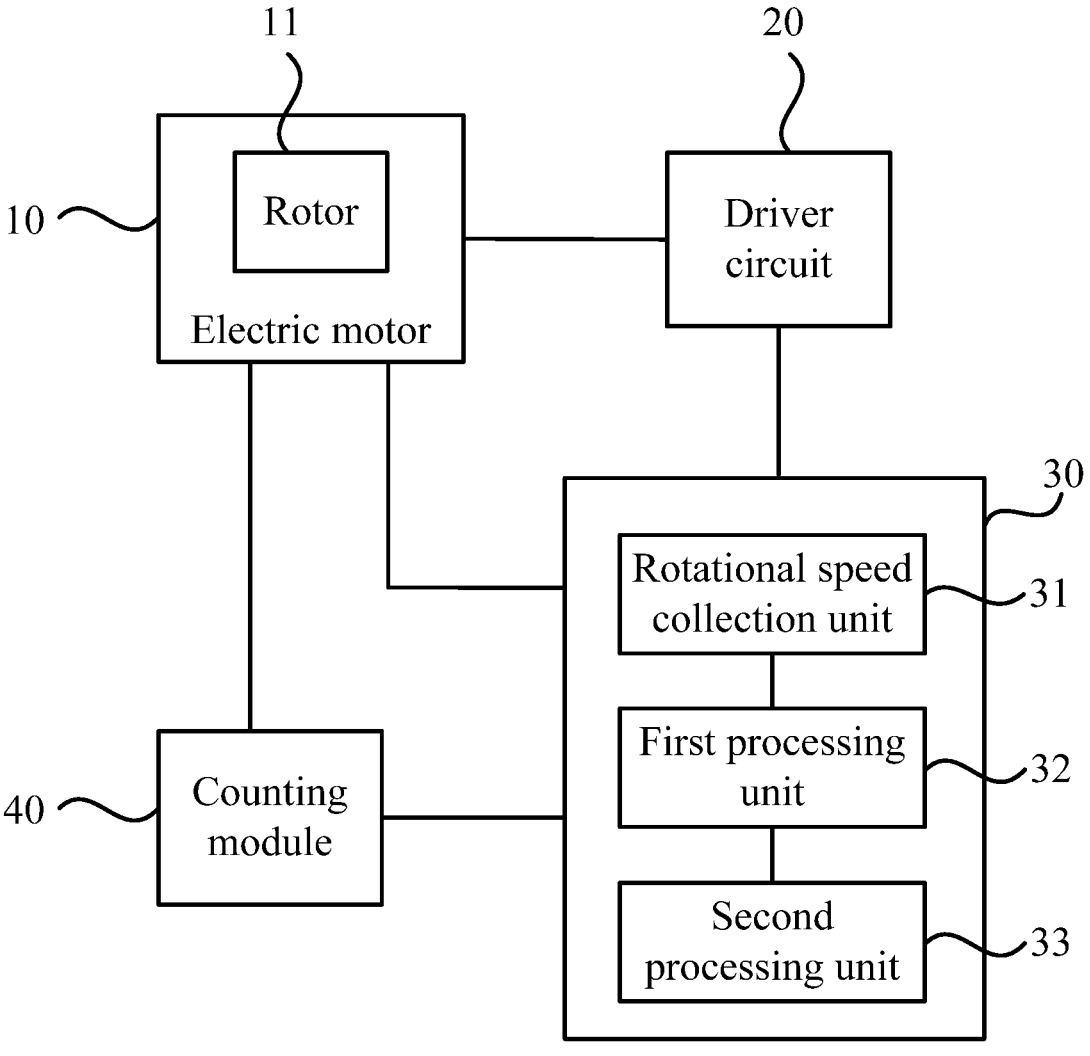
FIG. 4 is a schematic diagram of the electrical control of another power tool according to an example of the present application.

FIG. 4 is a schematic diagram of the electrical control of another power tool 100 according to an example of the present application. As shown in FIG. 4, the power tool 100 further includes a counting module 40 connected to the controller 30 and the electric motor 10 separately and configured to count the number of starts of the electric motor. If the number of starts of the electric motor is greater than the preset number of starts, the instruction to stop starting the electric motor is sent to the controller 30 so that the electric motor 10 stops starting.

The preset number of starts may be set according to the actual working conditions and is not limited in the examples of the present application, for example, 5 times.

Specifically, after the power tool 100 is powered on and started to work, the counting module 40 may add 1 to the number of starts of the electric motor every time the electric motor 10 restarts and may compare the current number of starts of the electric motor with the preset number of starts. If the number of starts of the electric motor is greater than the preset number of starts, it indicates that the electric motor 10 starts too frequently, and another abnormal situation, damage, or the like which causes frequent abnormal starts of the electric motor 10 may exist. The counting module 40 immediately sends the instruction to stop starting the electric motor to the controller 30 so that the controller 30 immediately controls, after receiving the instruction to stop starting the electric motor, the electric motor 10 to stop starting. Thus, it is convenient for the user to further check the power tool 100. If the number of starts of the electric motor is less than or equal to the preset number of starts, it indicates that the electric motor 10 may be stuck. The electric motor 10 may complete the start process by restarting and adjusting the position of the rotor and enters the working state of normal speed regulating. In this case, the counting module 40 sends the instruction to restart the electric motor to the controller 30 so that the controller 30 controls, after receiving the instruction to restart the electric motor, the electric motor 10 to restart. At the same time, the rotational speed collection unit 31 is caused to continue collecting the initial rotational speed value. In this manner, the counting module 40 monitors and limits the number of starts of the electric motor so that the reliability of the power tool 100 is further ensured and the efficiency with which the power tool 100 starts is greatly improved, thereby improving the user experience and the product competitiveness.

It is to be noted that after the controller 30 controls, according to the acquired instruction to stop starting the electric motor, the electric motor 10 to stop starting, the counting module 40 also clears the number of starts of the electric motor to avoid affecting the next normal use of the power tool 100.

Figure 5:
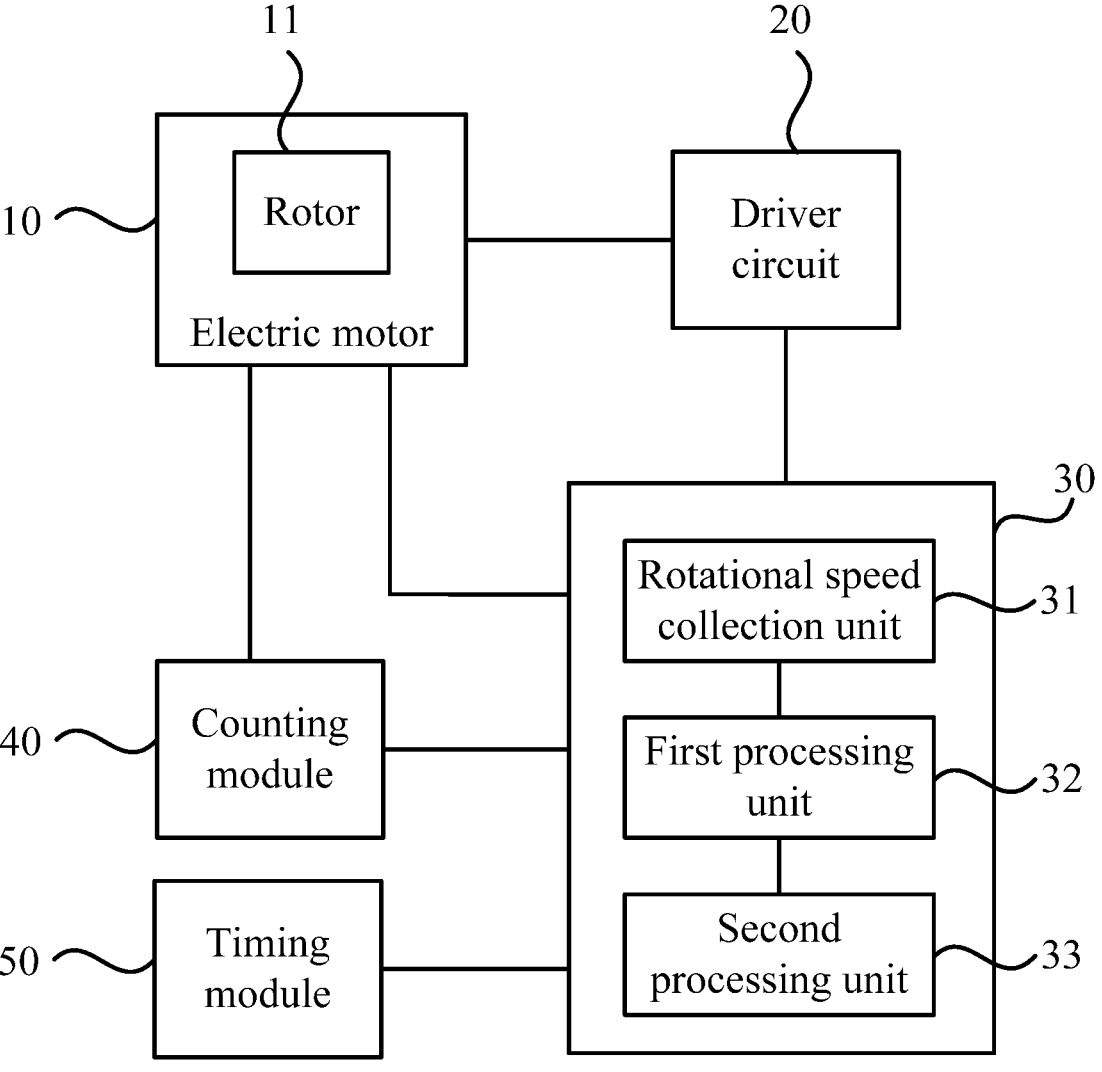
FIG. 5 is a schematic diagram of the electrical control of another power tool according to an example of the present application.

FIG. 5 is a schematic diagram of the electrical control of another power tool 100 according to an example of the present application. As shown in FIG. 5, the power tool 100 further includes a timing module 50 connected to the controller 30 and configured to count start duration. If the start duration is longer than preset start time, the instruction to stop starting the electric motor is sent to the controller 30 so that the electric motor 10 stops starting.

The specific value of the preset start time may be set according to the actual situation, which is not limited in the examples of the present application.

Specifically, after the power tool 100 is powered on and started to work, the timing module 50 starts counting the start duration and compares the start duration with the preset start time. If the start duration is longer than the preset start time, it indicates that a serious abnormality occurs in the start process of the electric motor 10, and the electric motor needs to be stopped immediately for a check. In this case, the timing module 50 immediately sends the instruction to stop starting the electric motor to the controller 30 so that the controller 30 immediately controls, after receiving the instruction to stop starting the electric motor, the electric motor 10 to stop starting. Thus, it is convenient for the user to further check the power tool 100, damage to the power tool 100 is avoided, and the reliability of the power tool 100 is improved.

Based on the same concept, an example of the present application further provides a method for controlling the start of a power tool 100. FIG. 6 is a flowchart of a method for controlling the start of a power tool 100 according to the example of the present application. As shown in FIGS. 2 and 6, the power tool 100 includes an electric motor 10, a driver circuit 20 electrically connected to the electric motor 10, and a controller 30 electrically connected to the electric motor 10 and the driver circuit 20 separately, and the electric motor 10 includes a rotor 11. The control method includes the steps described below.

In S501, the electric motor is started.

In S502, at a start stage of the electric motor, a preset configuration parameter is outputted and a working parameter of the electric motor is acquired so that the angular position of the rotor is estimated.

In S503, a drive signal is outputted to the driver circuit according to the angular position of the rotor so that the driver circuit drives the electric motor to rotate.

In S504, when an abnormal start of the electric motor is detected, a first control instruction is acquired so that the electric motor is controlled to restart or stop starting, where the first control instruction includes the instruction to stop starting the electric motor or the instruction to restart the electric motor.

In the examples of the present application, at the start stage of the electric motor, the controller outputs the preset configuration parameter and acquires the working parameter of the electric motor to estimate the angular position of the rotor and outputs the drive signal to the driver circuit according to the angular position of the rotor to drive the electric motor to rotate. In addition, when the abnormal start of the electric motor is detected, the electric motor is controlled through the acquired first control instruction to restart or stop starting. The first control instruction includes the instruction to stop starting the electric motor or the instruction to restart the electric motor so that the efficiency with which the power tool 100 starts can be greatly improved, thereby improving the user experience and the product competitiveness.

The scope of the present application is not limited to the preceding examples. It is to be understood by those skilled in the art that various modifications, combinations, subcombinations, and substitutions may be made according to design requirements and other factors. Any modification, equivalent substitution, improvement, and the like made within the spirit and principle of the present application are within the scope of the present application.

What is claimed is:

1. A cutting tool, comprising:
   a cutting element;
   an electric motor at least configured to drive the cutting element and comprising a stator having a plurality of windings and a rotor;

a driver circuit electrically connected to the electric motor to drive the electric motor to run;

a controller configured to estimate an angular position of the rotor based on a working parameter of the electric motor and output a drive signal to the driver circuit based on the angular position of the rotor to control the electric motor to enter a start stage; and a rotational speed collection unit at least configured to acquire an initial rotational speed value of the electric motor;

wherein, at the start stage, the controller is configured to output a first control instruction to control the electric motor to restart when an abnormal start of the electric motor is detected and the first control instruction comprises an instruction to acquire the angular position of the rotor with a high-frequency signal injection method;

wherein the controller is configured to determine, based on the acquired initial rotational speed value at the start stage, whether the electric motor starts abnormally, and control the electric motor to restart again when the rotational speed value of the electric motor is less than a second preset threshold and the current value of the electric motor is greater than or equal to a preset current threshold after the electric motor restarts.

2. The cutting tool according to claim 1, wherein the controller is configured to restart the electric motor when the initial rotational speed value is less than or equal to a first preset threshold.

3. The cutting tool according to claim 1, wherein the controller is configured to control the electric motor to continue starting when the initial rotational speed value is greater than a first preset threshold.

4. The cutting tool according to claim 1, wherein the controller is configured to control the electric motor to enter a normal speed regulating stage when it is detected that the rotational speed value of the electric motor is greater than or equal to a second preset threshold and the current value of the electric motor is less than a preset current threshold after the electric motor restarts.

5. The cutting tool according to claim 1, further comprising a counting module configured to count a number of starts of the electric motor at the start stage.

6. The cutting tool according to claim 5, wherein the controller is configured to output an instruction to stop starting the electric motor so as to control the electric motor to stop starting when the number of starts of the electric motor is greater than a preset number of starts.

7. The cutting tool according to claim 1, further comprising a timing module configured to count start duration of the electric motor at the start stage.

8. The cutting tool according to claim 7, wherein the controller is configured to output an instruction to stop starting the electric motor so as to control the electric motor to stop starting when the start duration is greater than preset start time.

9. The cutting tool according to claim 1, further comprising a power supply device at least configured to supply power to the electric motor and comprising at least one battery pack.

10. The cutting tool according to claim 1, wherein the cutting tool is a pole saw, a chain saw, a hedge trimmer, or a circular saw.

11. A power tool, comprising:

a cutting element;

an electric motor configured to drive the cutting element to perform a cutting function and comprising a stator having a plurality of windings and a rotor;

a driver circuit electrically connected to the electric motor to drive the electric motor to run; and a controller configured to estimate an angular position of the rotor based on a working parameter of the electric motor and output a drive signal to the driver circuit based on the angular position of the rotor to control rotation of the electric motor;

wherein, at a start stage, the controller is configured to output a first control instruction to control the electric motor to restart when an abnormal start of the electric motor is detected and the first control instruction comprises an instruction to acquire the angular position of the rotor with a high-frequency signal injection method;

wherein the controller comprises a rotational speed collection unit configured to acquire an initial rotational speed value of the electric motor at the start stage of the electric motor, the controller is configured to restart the electric motor when the initial rotational speed value is less than or equal to a first preset threshold, the working parameter of the electric motor comprises the rotational speed value and the current value, and the controller is configured to cause the electric motor to enter the normal speed regulating stage when the rotational speed value of the electric motor is greater than or equal to the second preset threshold and the current value of the electric motor is less than or equal to the preset current threshold or to otherwise input the first control instruction so as to restart the electric motor.

12. The power tool according to claim 11, further comprising a power supply device at least configured to supply power to the electric motor and comprising at least one battery pack.

13. A control method of a cutting tool, wherein the cutting tool comprises an electric motor having a rotor, a driver circuit electrically connected to the electric motor, and a controller electrically connected to the electric motor and the driver circuit separately, the control method comprising:

acquiring a working parameter of the electric motor;

estimating an angular position of the rotor according to the working parameter of the electric motor at a start stage of the electric motor;

outputting a drive signal to the driver circuit according to the angular position of the rotor so that the driver circuit drives the electric motor to rotate;

acquiring an initial rotational speed value of the electric motor at the start stage of the electric motor;

restarting the electric motor when the initial rotational speed value is less than or equal to a first preset threshold; and causing the electric motor to enter the normal speed regulating stage when the rotational speed value of the electric motor is greater than or equal to the second preset threshold and the current value of the electric motor is less than and equal to the preset current threshold or otherwise inputting the first control instruction so as to restart the electric motor.

14. The control method of the cutting tool according to claim 13, wherein the first control instruction comprises an instruction to acquire the angular position of the rotor with a high-frequency signal injection method.

* * * * *